US007120606B1

(12) United States Patent
Ranzini et al.

(10) Patent No.: US 7,120,606 B1
(45) Date of Patent: Oct. 10, 2006

(54) SYSTEM AND METHOD FOR SECURE ELECTRONIC FUND TRANSFERS

(75) Inventors: Stephen Lange Ranzini, Ann Arbor, MI (US); John Sheridan, Ann Arbor, MI (US)

(73) Assignees: Jove Corporation, Berkley, MI (US); National Center for Manufacturing Sciences, Ann Arbor, MI (US)

( * ) Notice: Subject to any disclaimer, the term of this patent is extended or adjusted under 35 U.S.C. 154(b) by 0 days.

(21) Appl. No.: 09/501,874

(22) Filed: Feb. 10, 2000

(51) Int. Cl.
G06F 17/60 (2006.01)

(52) U.S. Cl. .......................... 705/64; 705/57; 713/186

(58) Field of Classification Search .................. 705/64, 705/65, 67, 76, 35, 39, 42, 57, 58, 50, 51; 713/166, 200, 201, 202, 186, 176; 380/201, 380/202
See application file for complete search history.

(56) References Cited

U.S. PATENT DOCUMENTS

| 4,731,842 | A | * | 3/1988 | Smith | ........................... 380/24 |
| 5,371,797 | A | * | 12/1994 | Bocinsky, Jr. | ............... 705/70 |
| 5,963,647 | A | * | 10/1999 | Downing et al. | ............. 380/24 |
| 6,047,887 | A | * | 4/2000 | Rosen | ........................ 235/379 |
| 6,427,140 | B1 | | 7/2002 | Ginter et al. | ................. 705/80 |
| 6,574,609 | B1 | * | 6/2003 | Downs et al. | ................ 705/50 |
| 2001/0018739 | A1 | | 8/2001 | Anderson et al. | ........... 713/176 |
| 2002/0023055 | A1 | | 2/2002 | Antognini et al. | ............ 705/40 |
| 2002/0055909 | A1 | | 5/2002 | Fung et al. | ................... 705/42 |
| 2002/0126849 | A1 | | 9/2002 | Howard et al. | ............. 380/277 |

FOREIGN PATENT DOCUMENTS

JP       2001283007 A  * 10/2001

* cited by examiner

*Primary Examiner*—Elisca Pierre Eddy
(74) *Attorney, Agent, or Firm*—Morgan & Finnegan, L.L.P.

(57) ABSTRACT

A system and method for allowing simplified electronic transfer of funds in files subject to sender-defined access constraints. In one aspect of the system and method, a digital currency file is transmitted as an attachment to an electronic message. The sender of the digital currency file defines the level of security associated with the file, i.e., what the recipient must provide to access the funds.

184 Claims, 7 Drawing Sheets

Fig. 3

Messages Database 352

| Sender ID | Sender Name | Sender Address | Sender e-mail | Transmission Date | History Codes | Recipient ID | Recipient Name | Recipient Address | Recipient e-mail | Security Indicia |
|---|---|---|---|---|---|---|---|---|---|---|
| whdo3 952qh | J. Doe | 380 Madison Avenue NY, NY 12345 | jdoe@yahoo.com | 12/03/99 | 0000 | MeemsHAB05 | F. Smith | 824 Sepulveda Long Beach, CA 98765 | fsmith@netzero.com | password |
| | | | | | | | | | | |
| | | | | | | | | | | |
| | | | | | | | | | | |
| | | | | | | | | | | |

Fig. 4

Funds Database 354

| Creator | Creator ID | File No. | Date Created | Currency Amount | Date Transmitted | Recipient | Recipient ID | Security Attributes |
|---|---|---|---|---|---|---|---|---|
| J. Doe | whdo3952qh | 861794 | 12/03/99 | $125,000.00 | 12/03/99 | F. Smith | MeemsHAB05 | password |
| | | | | | | | | |
| | | | | | | | | |
| | | | | | | | | |

Fig. 5

Security Criteria Database 356

| Security Attribute | Validation Protocol | Validation Criteria | Automatic | Requires User Action | Associated File Nos. |
|---|---|---|---|---|---|
| Self ID | Enter verification of correct receipt | Affirmative response | NO | YES | |
| User ID Number | Password, SSN, EIN, PIN | Entry of correct number | NO | YES | 861794 |
| Signature ID | Enter signature | Entry of signature matching baseline entry | NO | YES | |
| Digital Certification | Process entry | Positive match | YES | NO | |
| Random No./Smart Card | Process entry | Positive match | NO | YES | |
| Biometric Scan | Retinal/fingerprint/voiceprint | Scan of Bio attribute matching baseline entry | NO | YES | |
| | | | | | |

SYSTEM AND METHOD FOR SECURE ELECTRONIC FUND TRANSFERS

FIELD OF INVENTION

This invention relates to a system and method for secure electronic fund transfers.

BACKGROUND OF THE INVENTION

With the advent of mass electronic communication and commerce, a need has arisen with respect to a simple way to transmit funds electronically for payment or other purposes in a completely secure manner. Prior electronic fund transfer approaches have a variety of flaws. FedWire is secure but not adaptable to routine applications. ATM network pins are widely available but not secure from electronic attack since they are typically four or five characters in length, which is insufficient to protect against brute strength attacks. Credit card networks have proven to be insecure from a variety of fraud attacks.

SUMMARY OF THE INVENTION

The system and method described below overcomes the problems discussed above by allowing simplified electronic transfer of funds in files subject to sender-defined access constraints. In one aspect of the system and method described below, digital currency file is transmitted as an attachment to an electronic message. The sender of the digital currency file defines the level of security associated with the file, i.e., what the recipient must provide to access the funds.

BRIEF DESCRIPTION OF THE DRAWINGS

The foregoing features and advantages of the described system and method can be appreciated more fully with reference to the accompanying drawings in which:

FIG. 3 illustrates a sample of the contents of the messages database stored in the central controller shown in FIG. 2;

FIG. 4 illustrates a sample of the contents of the funds database stored in the central controller shown in FIG. 2;

FIG. 5 illustrates a sample of the contents of the security criteria database stored in the central controller shown in FIG. 2;

DETAILED DESCRIPTION OF THE INVENTION

Figure 1:
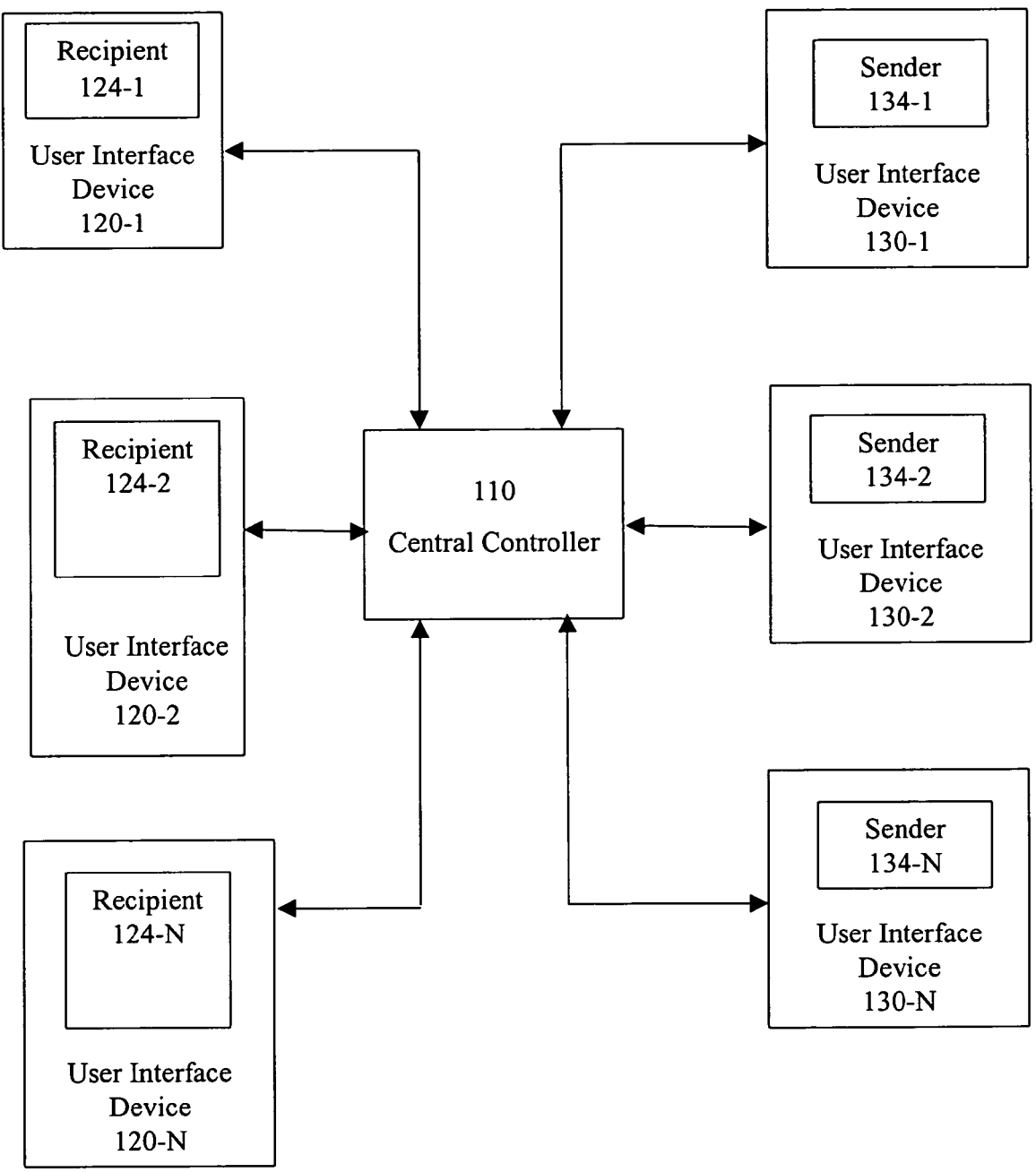
FIG. 1 is a schematic representation of one embodiment of the present system.

In one embodiment, the present system and method utilizes any e-mail program to send money as a file attachment in a secure environment. Digital currency is enclosed inside a digital funds container, for example a Digi-Box™, a digital rights management technology developed by InterTrust Technologies of Palo Alto, Calif. The Digi-Box™ is a currently available digital rights management technology. However, any digital rights management technology may be used. Access to the cash is governed by the rules mandated by the sender of the digital funds container. Endorsement (access) of the digital funds container can be as secure or insecure as the originator defines.

The first-time recipient of an e-mail with a file attachment containing cash (or a representation of cash) inside a digital funds container has two choices upon receipt: either reject the payment by returning it to the sender (the recipient could also not activate the file or delete the file) or activate (or download) the software necessary to access the cash. Once endorsement is accepted, the user has two choices, to keep the cash in a digital cash file for future use or send the cash back to his/her bank account via, for example, an Automated Clearing House ("ACH") transfer, SWIFT transfer or traditional FedWire transfer. Under one embodiment, the cost of the ACH transfer is established at $0.05 with a two-day delay. The cost of the FedWire or SWIFT transfer is established at $10.00 with immediate transfer. Transfer via ACH, SWIFT or FedWire is accomplished by e-mailing the cash (or representation of the cash) inside a digital funds holder to the clearing agent of the original sender of the cash (e.g., a Federal Reserve Bank or another bank clearing house) with instructions including the ABA number (or SWIFT designator) and account number to which they wish to have the cash transferred. The name on the account must match the name of the originator of the e-mail transfer request. If the cash is kept as a recipient's digital cash file, the recipient can subsequently pay others with the cash via cash enclosed inside a digital funds container attached to an email. Similarly, cash can be downloaded to a sender's digital currency file through a request of the sender's digital funds container clearing agent to ACH, send via SWIFT or FedWire funds from the sender's traditional bank account to the sender via an e-mail with the cash attached inside a digital funds container.

A user need only download the digital funds container application software once. Application software can also be distributed via the banking system on, e.g., CD-ROMs to customers or via internet banking applications. Application software can also be made accessible on-line without the need for downloading at, for example, the bank's portal site. However, this would require that a user is on-line in communication via the internet or other distributed computer network with either their own bank (which had resident application software on its website) or the digital funds clearing bank in order to use, access or create a digital cash transmission. Once application software is loaded onto the user's PC, digital funds containers can be used, accessed or created off-line.

It is important to note that the software to run this system is distributed quickly and efficiently to the users on an as needed or as desired basis. No recipient is obligated to accept payment in this manner and can reject payment, just as with checks. Consumer surveys indicate that consumers are looking for a way to send money "which is easy as e-mail". The present system and method uses the current internet infrastructure and protocols to facilitate electronic fund transfers through e-mail and thus will allow e-commerce on the internet to grow without the current barriers to electronic find transfers.

System of the Invention

The preferred embodiment of the present system and method uses typical hardware elements in the form of a computer workstation, operating system and application software elements which configure the hardware elements for operation in accordance with the present system and method. A typical workstation platform includes hardware such as a central processing unit ("CPU"), e.g., a Pentium® microprocessor, RAM, ROM, hard drive storage in which are stored various system and application programs and data used within the workstation, modem, display screen, keyboard, mouse and optional removable storage devices such as floppy drive or a CD ROM drive. The workstation hardware is configured by software including an operating system, e.g., Windows® 95, 98, NT or CE, networking software (including internet browsing software), e-mail software and application software components. The preferred embodiment also encompasses a typical file server platform including hardware such as a CPU, e.g., Pentium® microprocessor, RAM, ROM, hard drive, modem, and optional removable storage devices, e.g., floppy or CD ROM drive. The server hardware is configured by software including an operating system, e.g., Windows®, UNIX®, or Linux®, networking software (including Web server software), e-mail software and database software.

FIG. 1 shows one embodiment of the present system. In this embodiment, the system includes a central controller 110 configured to receive data via a distributed computer network from at least one sender 134 at remote terminals or interface user devices 130 and transmit data to at least one recipient 124 at remote terminals or interface user devices 120 over the network.

Central controller 110 preferably comprises a processor-based system that maintains databases and information relating to transferring files, messages or other data over the network. Central controller 110 provides the graphical user interface (GUI) to senders 134 at user interface devices 130 which allows senders to create and/or transmit secure files containing digital currency to one or more recipients 124 at user interface devices 120. In one embodiment, user interface devices 120 and 130 may be computers comprising one or more central processing units, one or more data storage devices, a monitor, a keyboard and/or any other components that may allow a user to implement the commands of the software and hardware functions described herein. In alternative embodiments, the user interface devices 120 and 130 may be a telephone, facsimile, online access device, voice response unit, wireless device or the like.

Central controller 110 stores information received from senders 134 in messages database 352, funds database 354 and security criteria database 356. As described more fully below, this information is used to securely transmit electronic funds to recipients 124. Although the present embodiment shows central controller 110 connected to a central communications authority, in a different embodiment the central controller might be located within the server of senders 134, recipients 124 or anywhere else in the distributed computer network. Also, some or all of the information in messages database 352, funds database 354 and security criteria database 356 may be copied and held on another central controller unit elsewhere in the distributed computer network for a variety of purposes such as recovery of data files lost by a processor failure, additional security measures or tracking of transactions and levels of activity within the network. In the preferred embodiment, the sender 134 uses application software for performing the secure digital cash file creation and/or transmission process of the invention. However, in a different embodiment, the distributed computer network could include such application software practically anywhere or such software could be integrated into the same program and reside at the same physical location. The structure of certain embodiments of the central controller 110 is described below in connection with FIG. 2.

Senders 134 include individuals or companies wishing to securely transmit electronic funds to a recipient 124. In one embodiment, senders 134 register with the central communication authority and transmit messages including digital currency file attachments to the central controller 110 through user interface device 130. The user interface device may be the user's computer or internet access device. In another embodiment, the user interface device 130 may be a telephone or cell phone either of which could incorporate technologies such as WAP or voice recognition software. Users 134 can transmit information in various ways. For instance, users may transmit information electronically by means of the internet.

It is anticipated that most applications of the described system and method to transmit electronic messages with attached file containing a digital representation of money will use a computer network, e.g., the internet, as the means for transmitting information, including wireless remote handheld devices, including devices using the WAP protocol. The World Wide Web is a distributed hypermedia computer system that uses the internet to facilitate global hypermedia communication using specified protocols. One such protocol is the Hypertext Transfer Protocol ("HTTP"), which facilitates communication of hypertext. Hypertext is the combination of information and links to other information. In the context of the Web, hypertext is defined by the Hypertext Mark-up Language ("HTML"). The links or hyperlinks in a HTML document reference the locations of resources on the Web, such as other HTML documents. Another language used in creating documents for use on the Worldwide Web, to display on computer screens, or to create speech style sheets for use in, e.g., telephones, is the Extensible Mark-Up Language ("XML"). XML is a "metalanguage", i.e., a language for describing languages that was developed to eliminate the restrictions of HTML.

The Web is a client-server system. The HTML documents are stored on Web server computers, typically in a hierarchical fashion with the root document being referred to as the home page. The client specifies a HTML document or other source on the server by transmitting a Uniform Resource Locator ("URL") that specifies the protocol to use, e.g., HTTP, the path to the server directory in which the resource is located, and filename of the resource. Users retrieve the documents via client computers. The software running on the user's client computer that enables the user to view HTML documents on the computer's video monitor and enter selections using the computer's keyboard and mouse is known as a browser. The browser typically includes a window in which the user may type a URL. A user may cause a URL to be transmitted by typing it in the designated window on the browser or by maneuvering the cursor to a position on the displayed document that corresponds to a hyperlink to a resource and actuating the mouse button. The latter method is commonly referred to simply as "clicking on the hot-spot" or "clicking on the hyperlink". The hyperlink methodology is contemplated for use in accordance with the preferred embodiment to access application software and to open, create and transmit messages, files and other information via the internet.

The digital rights management software application to transmit electronic finds, activate the digital funds container and access the funds inside is typically resident on a user's computer or can be downloaded from the internet on an as-needed basis if not preloaded on the PC. One such digital rights management software application is InterTrust Digi-Box™. The software used with Intertrust's Digi-Box™ is called an InterRightsPoint™. Once the software is downloaded a user can use the digital funds container to send digital cash to anyone they wish. In the case of the InterTrust software, the Digi-Box™ digital funds container itself adds just 7 k to the size of an e-mail file attachment. A Digi-Box™ Cash Purse, a digital representation of electronic cash, is a small plug-in type file that is transmitted with each e-mail as a part of the file attachment.

Figure 2:
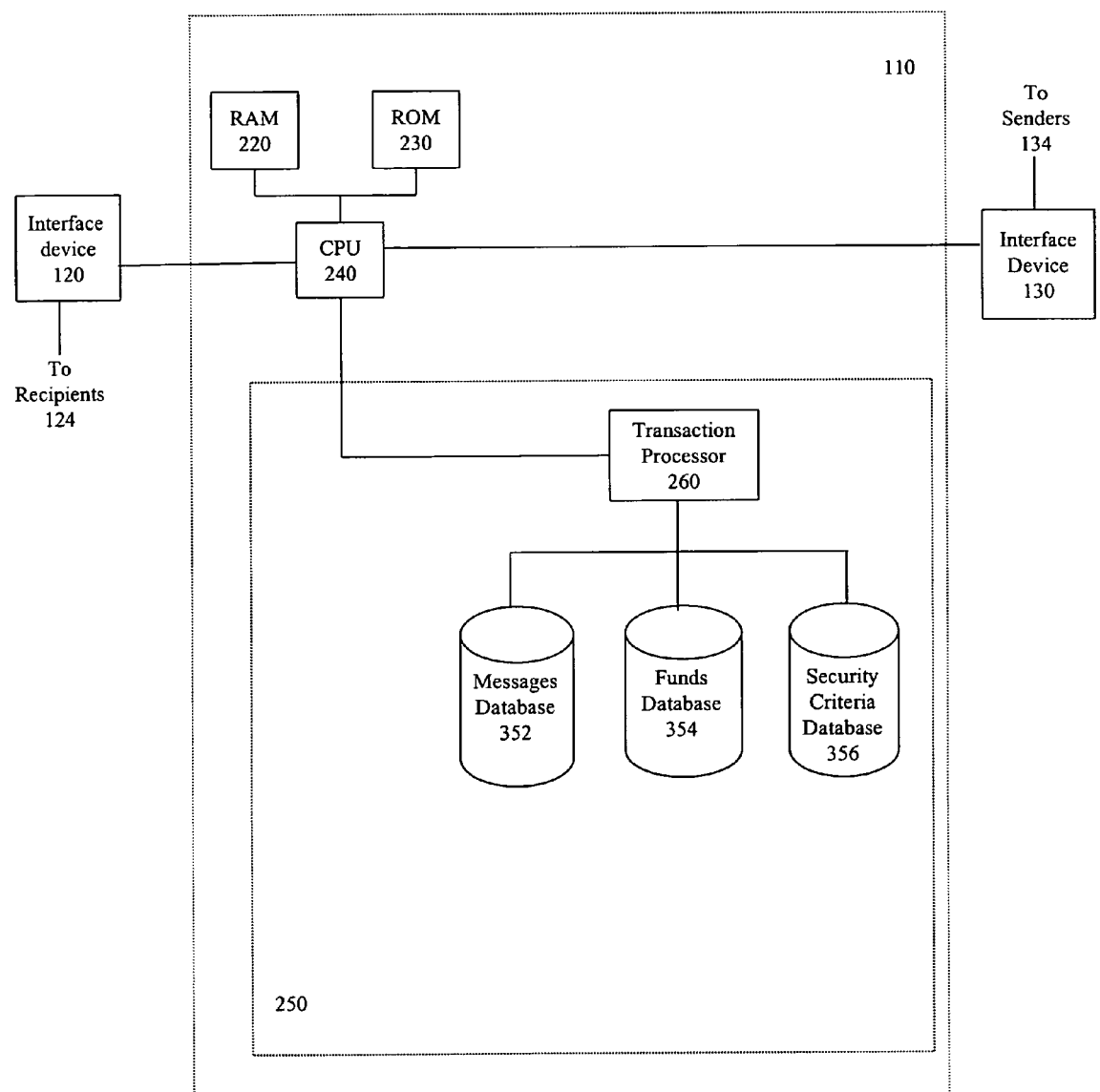
FIG. 2 is a schematic representation of one embodiment of the central controller used in the system shown in FIG. 1.

FIG. 2 illustrates one embodiment of the central controller 110 for a system according to the present invention. As shown in FIG. 2, central controller 110 includes central processing unit (CPU) 240, random access memory (RAM) 220, read-only memory (ROM) 230, and large capacity storage device 250. CPU 240, preferably comprising a conventional microprocessor such as an Intel Pentium® Processor, is electronically coupled to each of the central controller's 110 other elements.

CPU 240 executes program code stored in one or more of RAM 220, ROM 230 and storage device 250 to carry out the functions and acts described in connection with central controller 110. CPU 240 preferably comprises at least one high-speed digital data processor adequate to execute program modules for transmitting data, messages or information from senders 134. These modules are described in connection with FIG. 6. CPU 240 interacts with RAM 220, ROM 230 and storage device 250 to execute stored program code according to conventional data processing techniques.

User interface devices 120 and 130 comprise devices for allowing central controller 110 to communicate with recipients 124 and senders 134. Communication between these user interface devices 120 and the controller 110 is preferably electronic by means of the internet and preferably includes a conventional high speed modem, digital input/output line or the like employing known communication protocols capable of decrypting or decompressing encrypted or compressed data received from the interface user devices 120, 130.

Large capacity storage device 250 contains transaction processor 260, messages database 352, funds database 354, and security criteria database 356. Transaction processor 260 maintains, determines and accesses data stored in databases 352, 354, 356, and prepares information, data or messages for transmission to senders 134 and recipients 124 as described in connection with FIG. 6. Transaction processor 260 may comprise a separate, conventional CPU/microprocessor, or a portion of the operating function of CPU 240. Messages database 352 contains information related to electronic messages transmitted over the network. Funds database 354 contains information about each digital currency file created or transmitted by a user 134. Security criteria database 356 contains information relating to a sender's assigned security attributes that preclude unauthorized access to the currency files by other than the intended recipient 124. Samples of the types of respective fields that are contained in databases 352, 354 and 356 are shown and described in connection with FIGS. 3–5.

Database Formats

Samples of the contents of databases 352, 354 and 356 are shown in FIGS. 3–5, respectively. The specific data and fields illustrated in these figures represent only one embodiment of the records stored in the databases of the invention and are exemplary only. In most cases, the fields shown in FIGS. 3–5 are self-explanatory. It is to be understood that the data and fields, as well as the number of databases, can be readily modified from the described embodiment and adapted to provide variations for operating the system and method described, including transmitting electronic files, messages and other information. Furthermore, each field may contain more or less information. For example, an address field may be divided into separate fields containing street address, city, state, zip code, telephone number and e-mail.

Messages database 352 maintains (among other information) a compilation of all messages transmitted over the network by senders 134, recipients 124 and other network entities. In one embodiment, the information is automatically stored with appropriate archive data when a message is transmitted. Each record in messages database 352 corresponds to one unique message but a unique message can be different parts or attachments where appropriate.

FIG. 3 illustrates a sample record. As shown in FIG. 3, messages database 352 may contain fields corresponding to, for example, sender ID, sender name, sender physical address and e-mail address, transmission date, archive date, history codes, recipient ID, recipient name, recipient physical address and e-mail address, security indicia etc.

Many of the fields illustrated in FIG. 3 are self-explanatory. The message history field allows tracking of the transmission, receipt etc. of the message. The sender ID and recipient ID are examples of information known to users 134 or recipients 124 as well as to system administrators but not known to the general public and access to messages database 352, funds database 354 and security criteria database 356 could also be protected by digital rights management software such as Digi-Box™. The Digi-Box™ is used to prevent others from logging in or gaining access to the database under the user's or recipient's user ID or access code which provides access to central controller 110 or any of it's elements such as CPU 240. The central controller 110 uses the sender or recipient ID for a variety of purposes such as security, tracking of transactions or to verify that the current sender or recipient has previously provided registration information. Under alternative embodiments, providing registration information is optional. From this data and data stored in other databases, the data for the remaining fields can be generated.

Funds database 354 contains files containing digital currency. FIG. 4 illustrates a sample record of funds database 354. As shown in FIG. 4, funds database 354 contains information having fields corresponding to e.g., creator, creator ID number, digital currency file number, date created, amount of digital currency, date transmitted, recipient, recipient ID and security attributes. Under alternative embodiments, the digital currency is resident on another central controller in the distributed computer network and funds database 354 contains information identifying the address, name, URL location or other designator of that central controller. The data field that references an amount in U.S. Dollars is exemplary only, and under alternative embodiments, one or more other currencies or other units of exchange are enclosed, identified by address or represented within funds database 354.

Security criteria database 356 contains information about the security attributes that are available to be assigned to digital currency files stored in funds database 354 as well as information necessary to process a validation attempt by a recipient. FIG. 5 illustrates a sample record of security criteria database 356. As shown in FIG. 5, funds database 356 contains fields corresponding to, for example, assignable security attributes, validation protocols and criteria, whether validation is automatic or requires user action and the digital currency file numbers that have the particular security attributes assigned to them. The information in database 356 is invisible to senders or recipients except insofar as their input or validations are concerned. The data in security criteria database 356, as well as the messages database 352 and funds database 354, are routinely updated.

It should be understood that some information in certain fields is accessible by the system manager only, and other information is accessible by the senders and recipients, as well as network administrations or banking or government officials. For example, message data is information that may be available to the sender and recipient, as well as the system manager. Security indicia, however, is data that may only be known or in the possession of a recipient or the system manager. Further, all data that is personal to a sender or recipient is secured by utilization of encryption techniques and database access control mechanisms such as digital rights management software.

Figure 6:
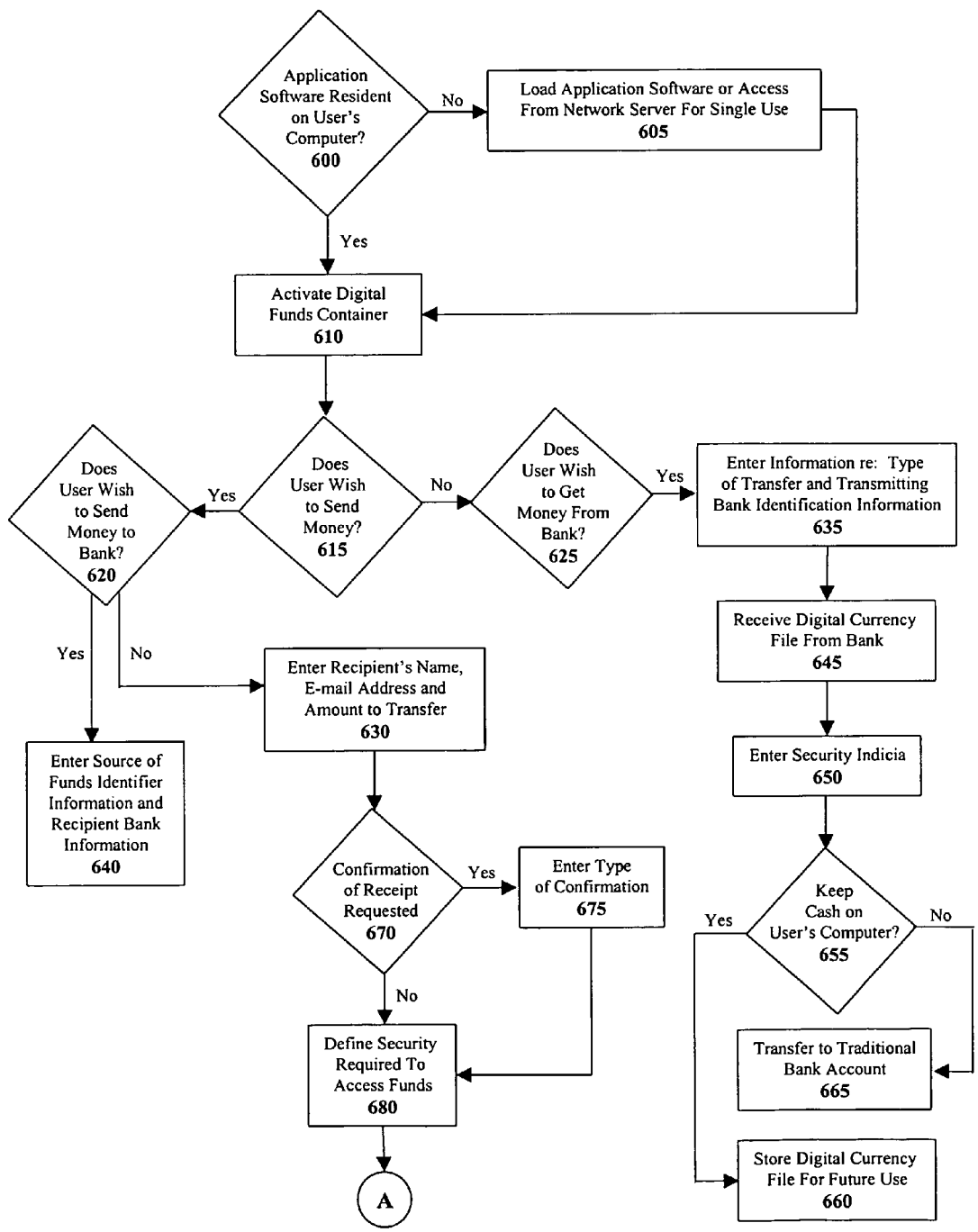
FIG. 6 is a flowchart illustrating a funds transfer process executed by the system shown in FIG. 1.
Figure 6:
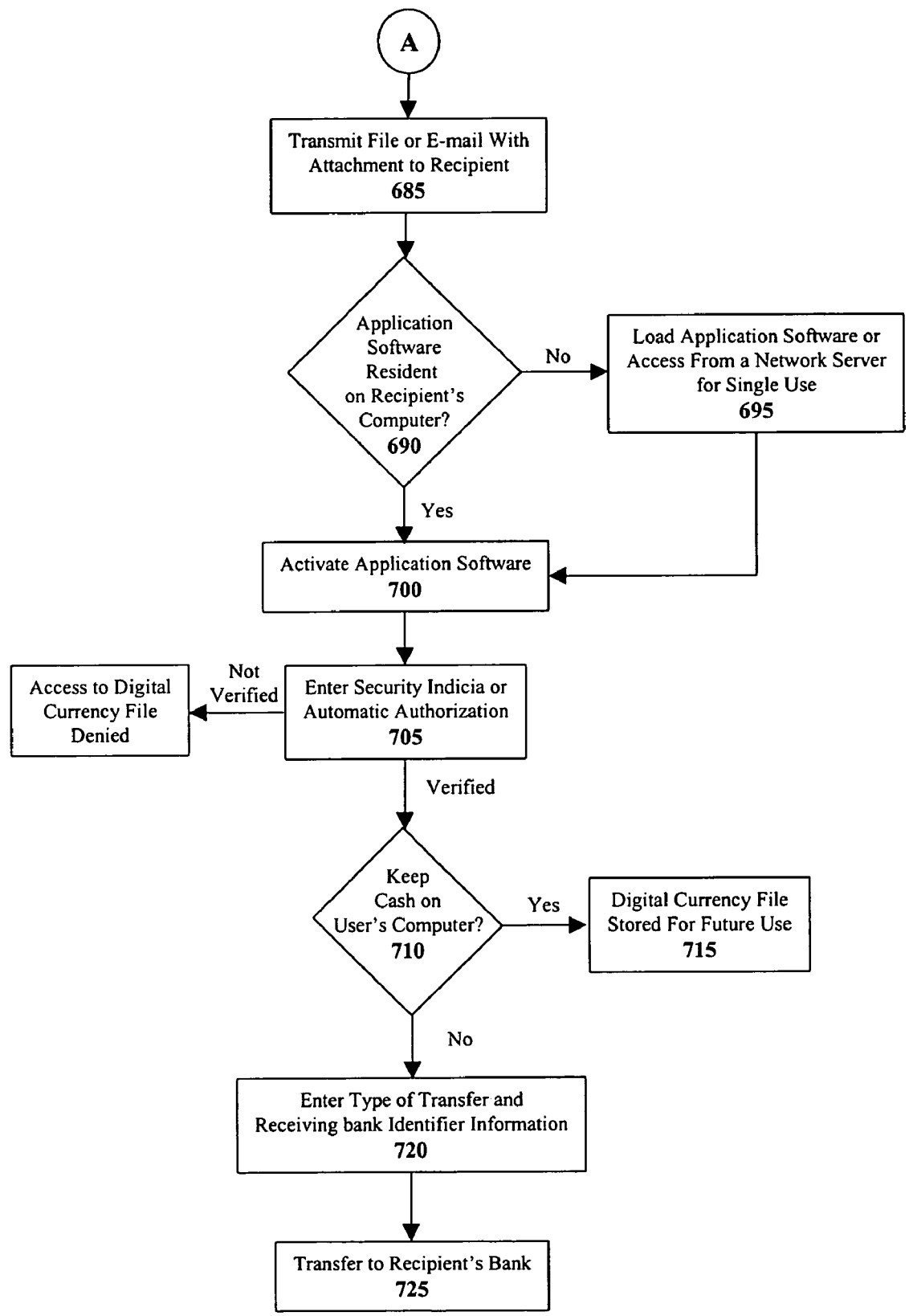

The process of creating and using data stored in messages database 352, funds database 354, and security criteria database 356 to effect dissemination and tracking of messages, files and electronic funds from senders 134 to recipients 124, as well as the other operations of the system described with reference to FIGS. 1 and 2, is represented in the flowchart of FIG. 6, described in detail below. Central controller 110 uses messages database 352, funds database 354, and security criteria database 356 to execute the electronic funds transfer processes of the invention.

Security/Endorsement

The contents of a digital funds container cannot be separated from the digital funds container itself or the rules for using the digital funds container and its contents. The file representing the cash itself appears as meaningless binary digits without translation authorization under the rules of the digital funds container, which are initially specified by the sender.

Upon receipt of an e-mail with attachment containing a file representing cash enclosed inside a digital funds container, or simply a file inside a digital funds container, the recipient must prove their identity or endorse the digital funds container, i.e., satisfy the previously-assigned security protocol. Typical ways to achieve endorsement security that can be used with the present system and method include, but are not limited to, the following:

1) The recipient merely asserts that he/she is the intended addressee.

2) The recipient proves that he/she is the addressee through password, SSN, EIN or PIN.

3) The recipient proves that he/she is the addressee through PC signature identification.

4) The recipient proves that he/she is the addressee through digital certificate or PKI.

5) The recipient proves that he/she is the addressee through random number generator card/smart card.

6) The recipient proves that he/she is the addressee through biometric scan retinal/fingerprint/voice print.

Depending on the amount of cash enclosed inside the digital funds holder, the sender may wish to vary the level of endorsement security. For example, the rules of the digital finds holder may specify a password for a $100 amount, no security for a $10 amount, a digital certificate for $1,000, a smart card for $10,000 and a retinal scan for $1,000,000. The level of endorsement security is left up to the sender.

Role of the Clearing Agent

Senders must register the first time they use the application software to either send cash to the traditional banking system or to take cash from the traditional banking system and download it to a digital cash file.

The clearing bank holds all cash inside digital funds containers in a deposit account for benefit of the registered owner. Each transaction generates a unique check number. Senders have the option of informing the clearing bank, e.g., via automated e-mail, of the identity of all recipients of cash inside digital funds containers that they transmit, or not to inform the clearing bank.

Recipients of cash inside digital fund containers also have the option of notifying the clearing bank, e.g., in an automated fashion via, e.g., e-mail of receipt of cash inside a digital funds container to legally transfer the funds and avoid "bounced checks". Since unlimited copies of the digital funds containers which contain digital cash can be made, the rules of the network will be established so that the first digital funds container "check" to clear with that unique check number owns the cash held at the clearing bank. The digital funds container "check" clears when the recipient informs the clearing bank, e.g. in an automated fashion via, e.g., e-mail of receipt of cash inside a digital funds container.

If a sender's computer crashes while digital cash is resident on the system, the money is not lost if registered, since the funds are actually registered with and held by the clearing bank in a deposit account for the benefit of the owner.

Recipients of cash inside a digital funds container can opt not to register the cash but they risk loss of the cash or having to reconstruct payments received from whomever sent them the money in the first place.

The clearing bank can establish rules on the cash held at the custodian deposit account. These accounts could be for the benefit of a correspondent bank that in turn has a direct relationship with the consumer, or the accounts could be held in a direct relationship with the consumer. Accounts held at clearing banks or correspondent banks could be interest paying or non-interest paying, entail fees or not entail fees at the option of the banks based on cost, profitability targets or strategic plan.

Sending, Receiving and Accessing Cash Inside a Digital Funds Container

Following is a detailed procedure for transferring digital funds in accordance with one embodiment of the invention. FIG. 6 is a flowchart schematically representing the procedure.

To start the process, the system determines whether application software is resident on the user's computer in step 600. If not, in step 605, the user is queried as to whether application software should be loaded onto the user computer or, alternatively, accessed from a remote server over a network for temporary use. To initiate a transfer of cash, the user activates the digital funds container in step 610 and clicks on the Send Money option in step 615. The options in the digital funds container are Send Money, Send Money to Bank, and Get Money from Bank.

If the user selects the Send the Money option in step 615 without further indicating a desire to send money to a bank, a dialog screen appears in step 630 that says:

"List name and e-mail address of who you want to send money to."

A form appears underneath this message, which has entry blocks for name, e-mail address and the amount of money to be transferred. Under alternative embodiments, the form also includes a multi-currency option. Under another alternative embodiment, the user has the option to exchange one currency designated in funds database 354 for another through the clearing bank.

When the sender clicks the Done button, a dialog screen appears which asks to confirm the information. Options are also presented if the sender wishes to receive a confirmation that the cash was received by the recipient, step 670, and another box to be checked if the sender wishes to notify the clearing bank of the transaction (not shown in FIG. 6). If the Okay button is selected, then a dialog box appears which asks the sender, in Step 680, to define the security required for the digital currency file to be opened by the recipient of the cash. A list of boxes that can be checked is presented with this pop-up dialog screen. When the Okay button is selected a digital currency file with the cash enclosed is created and saved in the user's digital funds container folder under a shortened name of the recipient and the date.

In the best of all worlds, the sender' e-mail system is then automatically booted up and a new e-mail message created with the e-mail address of the recipient already listed and the file with the cash inside a digital funds container already attached and ready to transmit. In the most likely scenario, the digital funds container software will then prompt the sender to activate the e-mail system, create a new e-mail message and manually attach the file with the cash inside a digital funds container as a file attachment to the e-mail manually created by the user. The sender can type any message in the e-mail text or subject line. For example, the subject can be the sender's account number or invoice number in the event that a payment is being sent to a large corporation such as a utility or credit card vendor. The e-mail text can be a personal greeting or any other message. When finished, the sender clicks on the Send button and the e-mail with the attached digital funds container containing a digital currency file is sent to the intended recipient in step 685.

If the file is lost or returned, the money is not lost, since a copy of the digital currency file is still resident on the sender's system as well as in funds database 354, and a second e-mail can be sent. If the file is intercepted, it can only be opened and the cash extracted if the recipient can endorse the digital cash file with the required security clearance and is the first to register the transaction with the clearing bank. Under alternative embodiments, the digital cash file must be opened by the recipient within a certain time limit to prevent brute force attacks on the security protocol.

If the sender requested any optional confirmations, they will receive one or more of: an e-mail from the clearing bank acknowledging transfer of title of the funds to recipient and a unique check number for confirmation purposes, an e-mail from the recipient acknowledging receipt of the e-mail with the cash inside a digital funds container, and e-mail from the network that the e-mail was delivered to the recipient and a time it was sent.

In step 700, where the application software is already installed on a recipient's computer, to download cash inside a digital funds holder the recipient of an e-mail with an attachment with cash inside a digital funds holder simply clicks (or otherwise activates) on the attachment, or when the digital funds holder is transmitted as a stand-alone file, clicks (or otherwise activates) on the file.

In step 705, depending on the endorsement security and whether or not it is automated, the user is either challenged for identification purposes or automatically authorized. The following identification methods could be automated: PC signature identification; digital certificate or PKI. The following methods would entail an identification challenge: request to verify name only; request for password, SSN, EIN or PIN; request for number password generated from random number generator card or smart card; request for personal identification through biometric scan, retinal scan, fingerprint scan or voice print. Other security identification methods could be used which are either automated or require identification challenge.

If the identification challenge is not met, the digital funds container cannot be opened and the cash or representation of cash inside the digital funds container cannot be accessed, used or transferred from the digital funds container.

Once the endorsement is authorized by the digital funds container, a pop-up dialog menu asks, in step 710:

"Do you wish to transfer the cash to a digital cash file on your PC for future digital payments, or do you wish to transfer the cash to your traditional bank account?"

If the user selects the Keep the Cash Here option, the cash is enclosed inside a digital currency file held on the user's PC or on the network, in step 715. If the user selects the Send the Money to my Bank option, a dialog screen asks:

"Do you wish a regular transfer or express transfer?"

If the user selects the Regular Transfer button, a dialog screen asks:

"This service costs $0.05 and the fee will be deducted from the amount you send. The cash will be transferred within 2 days to your account via the Automated Clearing House system. Do you wish to continue?"

An option to show this screen each time can be selected or unselected to speed users who are familiar with the system.

If the user selects the YES button, a dialog screen instructs the recipient, in step 720, to:

"Please enter your Bank's ABA number or Routing and Transit Number, your account number, your name and the amount you wish to send. If you need help click here."

A form is presented with this screen to enter the ABA number, account number, user's name and the amount to be sent. If the help button is clicked, a picture of a check appears with instructions to "look at your checks in your checkbook to find these numbers", which are circled and defined with picture examples given.

When done, the user clicks on the Ready To Send button. The information is then confirmed, and if the user clicks on the Okay button, an e-mail is transmitted to the clearing bank with the cash inside a digital funds container. On the final dialog screen, the user can check a box that says "please send confirmation receipt to me". Per the rules encoded in this digital funds container, only a clearing bank will be able to open and access this cash inside the digital funds container.

If the user selects the Express Transfer button, a screen appears with the following message and available options:

"This service costs $10.00 and the fee will be deducted from the amount you send. The cash will be immediately credited to your account via electronic funds transfer. Do you wish to continue?"

If the user selects the YES button, a dialog screen asks the recipient to:

"Please enter your Bank's ABA number or Routing and Transit Number, your account number, your name and the amount you wish to send. If you need help click here."

An option to show this screen each time can be selected or deselected depending on whether users are familiar with the system. The same process and screen are then presented as with the ACH Regular Transfer version of the process described above.

Under alternative embodiments, an option to send funds via the SWIFT system or other secure traditional banking or other alternative funds transfer systems is available to the user.

Any terms which are unfamiliar to typical users such as ACH, electronic funds transfer, ABA number, Routing and Transit Number, Account Number and SWIFT can be highlighted and have a hyperlink to a definition or explanation.

When application software is not resident on a recipient's computer but is instead accessed via a network, the procedure is as follows. When the recipient of an e-mail with an attachment with cash inside a digital funds container, or a stand-alone digital funds container who does not have application software installed on his/her PC clicks on the e-mail file attachment, they will first receive the following message, in step 695:

"No application software detected on your PC. Do you wish to download this application software plug-in or to do you wish to access the application software plug-in from the network without downloading this software to your computer's hard disk?"

If the recipient clicks on the Access Via Network button, they will be connected with the clearing bank's network server who holds the cash on deposit enclosed inside the digital cash file. While connected, they will be able to use and move the cash inside the digital funds container. If not connected, the recipient will not be able to access the digital funds container, but will be prompted to log in to, e.g., their internet service provider, local area network, or other distributed computer network to access the necessary application software. This procedure might be applicable where a recipient would like to try the digital funds transfer technology without spending the time to download the application software as a trial of the technology.

Application Software is downloaded as follows. If the user, sender or recipient, clicks on the button Download Application Software, they are taken to the clearing bank's network server who holds the cash on deposit enclosed inside the digital cash file. There the application software is downloaded in an automated fashion. The application software, e.g., an InterRights Point™, is typically about 10 MB in size, which means that at 28 k, it will take about 7.5 minutes to download. At 56 k, it will take 3.75 minutes. Obviously at higher connection speeds such as DSL, cable modems or other broadband technologies, the downloading time will be quite a bit faster. Under alternative embodiments, a single purpose InterRights Point™ is embedded in the digital funds container. The single purpose InterRights Point™ is much smaller in size, i.e., less than 1 MB in size. However, its functionality is limited to digital funds transfer. A regular InterRights Point™ can be used with many different digital rights management software applications, e.g. technologies to protect the security of .MP3 files, intellectual rights or database data.

Once downloading is completed, the user will have the option to register or not, and to be anonymous or not with respect to any e-mail list with information on updates and other compatible technology from the software vendor or the clearing bank. Once the application software is downloaded, the procedure will initiate from the beginning of the scenario described above where application software is already installed.

If the user selects the Get Money from Bank option in step 625, a dialog screen asks:

"Do you wish a regular transfer or express transfer?"

If the user selects the Regular Transfer button, a screen pops up that says:

"This service costs $0.05 and the fee will be deducted from the amount you send. The cash will be transferred within 2 days to your account via the Automated Clearing House system. Do you wish to continue?"

An option to show this screen each time can be selected or unselected to speed users who are familiar with the system.

If the user selects the YES button, a dialog screen appears that says:

"Please enter your Bank's ABA number or Routing and Transit Number, your account number, your name and the amount you wish to send. If you need help click here."

A form is presented with this screen to enter the ABA number, account number, user's name and the amount to be sent in step 635. If the help button is clicked, a picture of a check appears with instructions to "look at your checks in your checkbook to find these numbers", which are circled and defined with picture examples given.

When done, the user clicks on the Ready to Send button. The information is then confirmed, and if the user clicks on the Okay button, an e-mail is transmitted to the clearing bank with the request to transfer cash back to the user via an e-mail with attachment with cash inside a digital funds container. On the final screen, the user can check a box that says "please send confirmation receipt to me". Other boxes give an option to have an e-mail confirmation that the message was sent or require the recipient to confirm that the message was received. Per the rules encoded in this digital funds container, only a clearing bank will be able to open and access this e-mail attachment inside the digital funds container. Once the clearing bank receives the e-mail, an e-mail with attachment with a message inside a digital funds container is automatically sent back to the user confirming the transaction requested and the date the transaction will occur. In alternative embodiments, the clearing bank issues to the sender an identification challenge similar to that in step 705 to ensure the identity of the sender of an e-mail requesting withdrawal of funds from the clearing bank.

In the event that the option is clicked requiring the recipient to confirm that the e-mail was received, the first message received when the file attachment is double-clicked is "please confirm receipt of message by reply to sender". The sender must send an e-mail confirming receipt before the digital funds container can be opened.

On the date of the transfer, if the account has insufficient funds, an automated message is sent to the user notifying them of this fact with a due bill for the overdraft fee. In alternative embodiments, the overdraft fee is waived, or overdraft protection on the account is activated and the funds provided anyway. If the account has sufficient funds, an e-mail is automatically generated by the clearing bank with a file attachment with cash inside a digital funds container. The user then receives the digital currency file in step 645 and satisfies the appropriate security criteria in step 650. The user is then prompted to indicate, in steps 655, 660 and 665, whether the funds are to be stored in digital form for future use or transferred to a traditional bank account as follows:

"Do you wish to transfer the cash to a digital cash file on your PC for future digital payments, or do you wish to transfer the cash to your traditional bank account?"

If the user selects the Express Transfer button, a dialog screen appears that says:

"This service costs $10.00 and the fee will be deducted from the amount you send. The cash will be immediately credited to your account via electronic funds transfer. Do you wish to continue?"

If the user selects the YES button, a dialog screen asks the user to:

"Please enter your Bank's ABA number or Routing and Transit Number, your account number, your name and the amount you wish to send. If you need help click here."

An option to show this screen each time can be selected or unselected to speed users who are familiar with the system.

The same process and screen are then presented as with the ACH version of the process, except that the clearing bank sends the transaction through to the traditional FedWire system if the name and account information match. It is important to note that for security reasons it is inadvisable to accept requests to send or receive money through the traditional FedWire system or ACH system when the user is not strictly using their own account. As the security technology matures and a comfort level is created, clearing banks may begin to allow users to access the system for other purposes such as person to person transfer of funds, or corporate to person transfer of funds.

Closer integration of the digital funds container technology with traditional e-mail and browsers will facilitate ease of use. The system and method as described above is very easy and user friendly.

It will be apparent to those skilled in the art that various modifications and variations can be made in the system and processes described herein without departing from the spirit or scope of the invention. Thus, it is intended that the present description cover all modifications and variations provided they come within the scope of the appended claims and their equivalents. In this context, equivalents mean each and every implementation for carrying out the functions recited in the claims, even if not explicitly described herein.

While the best mode for carrying out the preferred embodiment has been illustrated and described in detail, those familiar with the art will recognize various alternative designs and embodiments that fall within the spirit of the system and method described herein. The appended claims are intended to cover all those changes and modifications falling within the true spirit and scope of the present system and method.

The invention claimed is:

1. A method for securely transferring electronic funds comprising:
   (a) assigning, through the use of a computer program resident on a personal computer and without the use of a secure network, at least one sender-defined security attribute to a digital rights management container containing a digital representation of money, wherein the at least one security attribute precludes unauthorized access to the container containing the digital representation of money, and wherein the at least one sender-defined security attribute is defined at the time of an electronic fund transfer;
   (b) encrypting data contained within the digital rights management container via the computer program resident on the personal computer; and
   (c) transmitting the container containing a digital representation of money over an insecure network to a recipient,
   wherein the at least one security attribute is requirement that the recipient of the digital rights management container containing a digital representation of money prove they are the intended recipient through either a random number generator card, smart card, or biometric scan comprised of a retina scan, fingerprint, or voiceprint.

2. The method of claim 1, wherein the recipient of the file containing a digital representation of money enters security indicia which allows access to the file containing a digital representation of money.

3. The method of claim 2, wherein the security indicia must be entered prior to a time limit for access upon receipt by the recipient, wherein the time limit is established by a sender who transmits the file.

4. The method of claim 1, wherein the at least one security attribute is the requirement that a recipient of the file containing a digital representation of money enter a password, social security number, employee identification number or personal identification number.

5. The method of claim 1, wherein the at least one security attribute is the requirement that a recipient of the file continuing a digital representation of money prove they are the intended recipient through computer signature identification.

6. The method of claim 1, wherein the at least one security attribute is the requirement that a recipient of the file containing a digital representation of money prove they are the intended recipient through entry of a digital certificate or PKI.

7. The method of claim 1, wherein the file containing a digital representation of money is transmitted over a distributed computer network.

8. The method of claim 7, wherein the computer network is the internet.

9. The method of claim 7, wherein the computer network is nonproprietary.

10. The method of claim 1, wherein application software for securely transferring electronic funds is resident on the transferor's computer.

11. The method of claim 1, wherein application software for securely transferring electronic funds is accessed from a computer or server remote from the transferor's computer on an as-needed basis.

12. The method of claim 1, further comprising receipt of a confirmation that funds were successfully transferred.

13. The method of claim 12, wherein the confirmation is an electronic message from a clearing bank acknowledging transfer of title of the funds to the recipient.

14. The method of claim 13, wherein the confirmation further includes a unique number associated with the funds transfer.

15. The method of claim 12, wherein the confirmation is an electronic mail message from the recipient of the electronic funds.

16. The method of claim 12, wherein the confirmation is an electronic message from a network that the electronic message with digital cash file attached was delivered to the recipient.

17. The method of claim 1, wherein the electronic funds transfer is of money from a traditional bank account.

18. The method of claim 17, wherein the recipient of the money from a traditional bank account initiates the transfer.

19. The method of claim 17, wherein the electronic funds transfer of money is in one or more currencies or representations of money.

20. The method of claim 19, wherein the user can request from a clearing bank the conversion of one or more currencies or representations of money contained in a file containing a digital representation of money into different currencies or representations of money.

21. The method for securely transferring electronic funds of claim 1, wherein the recipient chooses between maintaining the digital representation of money as a digital representation of money and depositing the digital representation of money into his bank account.

22. The method for securely transferring electronic funds of claim 1, wherein a sender, who initiates the transmittal of the container containing a digital representation of money, chooses between notifying and not notifying a clearing bank upon transmittal of the digital rights management container.

23. The method for securely transferring electronic funds of claim 1, wherein the digital rights management container includes information related to the sender's bank account and a quantity of funds and does not include information related to the recipient's bank account.

24. A method for receiving a digital rights management container containing electronic funds comprising:
(a) receiving a digital rights management container containing a digital representation of money, via an insecure network, wherein the container containing a digital representation of money has at least one sender-defined security attribute which precludes unauthorized access to the container, wherein the at least one sender-defined security attribute is defined at the time a sender sends the digital rights management container; and
(b) entering security indicia, through the use of a computer program resident on a personal computer and without the use of a secure network, which allows access to the container containing a digital representation of money,
wherein the at least one security attribute is requirement that a recipient of the digital rights management container containing a digital representation of money prove they are the intended recipient through either a random number generator card, smart card, or biometric scan comprised of a retina scan, fingerprint, or voiceprint.

25. The method of claim 24, wherein the security indicia is a verification by the recipient that the correct party has received the file containing a digital representation of money.

26. The method of claim 24, wherein the security indicia is a password, social security number, employee identification number or personal identification number.

27. The method of claim 24, wherein the security indicia is computer signature identification of the recipient.

28. The method of claim 24, wherein the security indicia is a digital certificate or PKI.

29. The method of claim 24, wherein the security indicia is a random number generator card or smart card.

30. The method of claim 24, wherein the security indicium is retinal scan data, a fingerprint or a voiceprint.

31. The method of claim 24, wherein the recipient transfers the digital representation of money to a traditional bank account.

32. The method of claim 31, wherein the electronic funds transfer of money is in one or more currencies or representations of money.

33. The method of claim 32, wherein the user can request from a clearing bank the conversion of one or more currencies or representations of money contained in a file containing a digital representation of money into different currencies or representations of money.

34. The method of claim 24, wherein the recipient maintains the file containing the digital representation of money in a digital form for future digital payments.

35. The method of claim 34, wherein the recipient maintains more than one currency or representation of money in a digital form for future digital payments.

36. The method of claim 24, wherein a recipient initiates the transfer and receives the money from a traditional back account.

37. The method of claim 24, wherein the security indicia must be entered prior to a time limit for access upon receipt by the recipient, wherein the time limit is established by a sender who transmits the file.

38. A method for securely transferring electronic finds comprising:
(a) creating a computer file containing a digital representation of money;
(b) assigning, through the use of a computer program resident on a personal computer and without the use of a secure network, at least one sender-defined security attribute to the file containing a digital representation of money, wherein the at least one security attribute precludes unauthorized access to the file containing the digital representation of money, and wherein the at least one sender-defined security attribute is defined at the time of an electronic fund transfer;
(c) attaching the file containing a digital representation of money to an electronic mail message; and
(d) transmitting the electronic mail message with attached file containing a digital representation of money over an insecure network to a recipient,
wherein the at least one security attribute is requirement that the recipient of the file containing a digital representation of money prove they are the intended recipient through either a random number generator card, smart card, or biometric scan comprised of a retina scan, fingerprint, or voiceprint.

39. The method of claim 38, wherein the recipient of the electronic mail message with attached file containing a digital representation of money enters security indicia which allows access to the file containing a digital representation of money.

40. The method of claim 39, wherein the security indicia must be entered prior to a time limit for access upon receipt by the recipient, wherein the time limit is established by a sender who transmits the file.

41. The method of claim 40, wherein the recipient must acknowledge receipt of the file containing a digital representation of money within the time limit established by the sender.

42. The method of claim 40, wherein the recipient must register receipt of the file containing a digital representation of money with a third-party within the time limit established by the sender.

43. The method of claim 40, wherein the recipient must activate or access the file containing a digital representation of money within the time limit established by the sender.

44. The method of claim 38, wherein the at least one security attribute is the requirement that a recipient of the file containing a digital representation of money enter a password, social security number, employee identification number or personal identification number.

45. The method of claim 38, wherein the at least one security attribute is the requirement that a recipient of the file containing a digital representation of money prove they are the intended recipient through computer signature identification.

46. The method of claim 38, wherein the at least one security attribute is the requirement that a recipient of the file containing a digital representation of money prove they are the intended recipient through entry of a digital certificate or PKI.

47. The method of claim 38, wherein the electronic mail message with attached file containing a digital representation of money is transmitted over a distributed computer network.

48. The method of claim 47, wherein the computer network is the internet.

49. The method of claim 47, wherein the computer network is nonproprietary.

50. The method of claim 38, wherein application software for securely transferring electronic funds is resident on the transferor's computer.

51. The method of claim 38, wherein application software for securely transferring electronic funds is accessed from a computer or server remote from the transferor's computer on an as-needed basis.

52. The method of claim 38, further comprising receipt of a confirmation that funds were successfully transferred.

53. The method of claim 52, wherein the confirmation is an electronic message from a clearing bank acknowledging transfer of title of the funds to the recipient.

54. The method of claim 53, wherein the confirmation further includes a unique number associated with the funds transfer.

55. The method of claim 52, wherein the confirmation is an electronic mail message from the recipient of the electronic funds.

56. The method of claim 52, wherein the confirmation is an electronic message from a network that the electronic message with digital cash file attached was delivered to the recipient.

57. The method of claim 38, wherein the electronic funds transfer is of money from a traditional bank account.

58. The method of claim 57, wherein a recipient of the money from a traditional bank account initiates the transfer.

59. The method of claim 57, wherein the electronic funds transfer of money is in one or more currencies or representations of money.

60. The method of claim 59, wherein the user can request from a clearing bank the conversion of one or more currencies or representations of money contained in a file containing a digital representation of money into different currencies or representations of money.

61. The method of claim 38, wherein one of the security attributes of the file containing a digital representation of money is a time limit for certain actions by the recipient.

62. The method for securely transferring electronic funds of claim 38, wherein the computer file is a single computer-readable file; and wherein the single computer-readable file includes information related to a sender's bank account, a quantity of funds to be transferred, a message from the sender to the recipient, e-mail addresses of the sender and the recipient and information regarding the sender-defined security attribute.

63. A method for receiving a secure file containing electronic funds comprising:

(a) receiving an electronic mail message with an attached computer file containing a digital representation of money, via an insecure network, wherein the file containing a digital representation of money has at least one sender-defined security attribute which precludes unauthorized access to the file, wherein the at least one sender-defined security attribute is defined at the time a sender sends the secure file; and (b) entering security indicium, through the use of a computer program resident on a personal computer and without the use of a secure network, which allows access to the file containing a digital representation of money, wherein the at least one security attribute requires that a recipient of the file containing a digital representation of money prove they are the intended recipient through either a random number generator card, smart card, or biometric scan comprised of a retina scan, fingerprint, or voiceprint.

64. The method of claim 63, wherein the security indicia is a verification by the recipient that the electronic message with attached file containing a digital representation of money has been received by the correct party.

65. The method of claim 63, wherein the security indicia is a password, social security number, employee identification number or personal identification number.

66. The method of claim 63, wherein the security indicia is computer signature identification of the recipient.

67. The method of claim 63, wherein the security indicia is a digital certificate or PKI.

68. The method of claim 63, wherein the security indicia is a random number generator card or smart card.

69. The method of claim 63, wherein the security indicium is retinal scan data, a fingerprint or a voiceprint.

70. The method of claim 63, wherein the recipient transfers the digital representation of money to a traditional bank account.

71. The method of claim 70, wherein the electronic funds transfer of money is in one or more currencies or representations of money.

72. The method of claim 71, wherein the user can request from a clearing bank the conversion of one or more currencies or representations of money contained in a file containing a digital representation of money into different currencies or representations of money.

73. The method of claim 63, wherein the recipient maintains the file containing the digital representation of money in a digital form for future digital payments.

74. The method of claim 73, wherein the recipient maintains more than one currency or representation of money in a digital form for future digital payments.

75. The method of claim 63, wherein a recipient initiates the transfer and receives the money from a traditional bank account.

76. The method of claim 63, wherein the security indicia must be entered prior to a time limit for access upon receipt by the recipient, wherein the time limit is established by a sender who transmits the file.

77. The method of claim 76, wherein the recipient must acknowledge receipt of the file containing a digital representation of money within the time limit established by the sender.

78. The method of claim 76, wherein the recipient must register receipt of the file containing a digital representation of money with a third-party within the time limit established by the sender.

79. The method of claim 76, wherein the recipient must activate or access the file containing a digital representation of money within the time limit established by the sender.

80. A system for securely transferring electronic funds comprising:
  (a) means for assigning, through the use of a computer program resident on a personal computer and without the use of a secure network, at least one sender-defined security attribute to a digital rights management container containing a digital representation of money, wherein the at least one sender-defined security attribute precludes unauthorized access to the container containing the digital representation of money, and wherein the at least one sender-defined security attribute is defined at the time of an electronic fund transfer; and
  (b) means for transmitting the container containing a digital representation of money over an insecure network to a recipient,
  wherein the at least one security attribute requires that the recipient of the digital rights management container containing a digital representation of money prove they are the intended recipient through either a random number generator card, smart card, or biometric scan comprised of a retina scan, fingerprint, or voiceprint.

81. The system of claim 80, further comprising means for allowing the recipient of the file containing a digital representation of money to enter security indicia, which allows access to the file containing a digital representation of money.

82. The system of claim 81, wherein the security indicia must be entered prior to a time limit for access upon receipt by the recipient, wherein the time limit is established by a sender who transmits the file.

83. The system of claim 82, wherein the recipient must acknowledge receipt of the file containing a digital representation of money within the time limit established by the sender.

84. The system of claim 82, wherein the recipient must register receipt of the file containing a digital representation of money with a third-party within the time limit established by the sender.

85. The system of claim 82, wherein the recipient must activate or access the file containing a digital representation of money within the time limit established by the sender.

86. The system of claim 80, wherein the at least one security attribute is the requirement that a recipient of the file containing a digital representation of money enter a password, social security number, employee identification number or personal identification number.

87. The system of claim 80, wherein the at least one security attribute is the requirement that a recipient of the file containing a digital representation of money prove they are the intended recipient through computer signature identification.

88. The system of claim 80, wherein the at least one security attribute is the requirement that a recipient of the file containing a digital representation of money prove they are the intended recipient through entry of a digital certificate or PKI.

89. The system of claim 80 wherein the means for transmitting the electronic mail message with attached containing a digital representation of money to a recipient is a means for transmission over a distributed computer network.

90. The system of claim 89, wherein the computer network is the internet.

91. The system of claim 89, wherein the computer network is nonproprietary.

92. The system of claim 80, wherein application software for securely transferring electronic funds is resident on the transferor's computer.

93. The system of claim 80, wherein application software for securely transferring electronic funds is accessed from a computer or server remote from the transferor's computer on an as-needed basis.

94. The system of claim 80, further comprising means for receiving a confirmation that funds were successfully transferred.

95. The system of claim 94, wherein the confirmation is an electronic message from a clearing bank acknowledging transfer of title of the funds to the recipient.

96. The system of claim 95, wherein the confirmation further includes a unique number associated with the funds transfer.

97. The system of claim 94, wherein the confirmation is an electronic mail message from the recipient of the electronic funds.

98. The system of claim 94, wherein the confirmation is an electronic message from a network that the electronic message with digital cash file attached was delivered to the recipient.

99. The system of claim 80, wherein the electronic funds transfer is of money from a traditional bank account.

100. The system of claim 99, wherein the recipient of the money from a traditional bank account initiates the transfer.

101. The system of claim 99, wherein the electronic funds transfer of money is in one or more currencies or representations of money.

102. The system of claim 101, wherein the user can request from a clearing bank the conversion of one or more currencies or representations of money contained in a file containing a digital representation of money into different currencies or representations of money.

103. The system of claim 80, wherein one of the security attributes of the file containing a digital representation of money is a time limit for certain actions by the recipient.

104. A system for receiving a digital rights management container containing electronic funds comprising:
  (a) means for receiving a digital rights management container containing a digital representation of money, via an insecure network, wherein the container containing a digital representation of money of money has at least one sender-defined security attribute which precludes unauthorized access to the container, and wherein the at least one sender-defined security attribute is defined at the time a sender sends the digital rights management container; and
  (b) means for entering security indicia, through the use of a computer program resident on a personal computer and without the use of a secure network, which allows access to the container containing a digital representation of money,
  wherein the at least one security attribute requires that a recipient of the digital rights management container containing a digital representation of money prove they are the intended recipient through either a random number generator card, smart card, or biometric scan comprised of a retina scan, fingerprint, or voiceprint.

105. The system of claim 104, wherein the security indicia is a verification by the recipient that the electronic message with attached file containing digital representation of money has been received by the correct party.

106. The system of claim 104, wherein the security indicia is a password, social security number, employee identification number or personal identification number.

107. The system of claim 104, wherein the security indicia is computer signature identification of the recipient.

108. The system of claim 104, wherein the security indicia is a digital certificate or PKI.

109. The system of claim 104, wherein the security indicia is a random number generator card or smart card.

110. The system of claim 104, wherein the security indicium is retinal scan data, a fingerprint or a voiceprint.

111. The system of claim 104, wherein the recipient transfers the digital representation of money to a traditional bank account.

112. The system of claim 111, wherein the electronic funds transfer of money is in one or more currencies or representations of money.

113. The system of claim 112, wherein the user can request from a clearing bank the conversion of one or more currencies or representations of money contained in a file containing a digital representation of money into different currencies or representations of money.

114. The system of claim 104, wherein the recipient maintains the file containing the digital representation of money in a digital form for future digital payments.

115. The system of claim 114, wherein the recipient maintains more than one currency or representation of money in a digital form for future digital payments.

116. The system of claim 104, wherein a recipient initiates the transfer and receives the money from a traditional bank account.

117. The system of claim 104, wherein one of the security attributes of the file containing a digital representation of money is a time limit for certain actions by the recipient.

118. The system of claim 104, wherein the security indicia must be entered prior to a time limit for access upon receipt by the recipient, wherein the time limit is established by a sender who transmits the file.

119. The system of claim 100, wherein the recipient must acknowledge receipt of the file containing a digital representation of money within the time limit established by the sender.

120. The system of claim 100, wherein the recipient must register receipt of the file containing a digital representation of money with a third-party within the time limit established by the sender.

121. The system of claim 100, wherein the recipient must activate or access the file containing a digital representation of money within the time limit established by the sender.

122. A system for securely transferring electronic funds comprising:
  (a) means for creating a computer file containing a digital representation of money;
  (b) means for assigning, through the use of a computer program resident on a personal computer and without the use of a secure network, at least one sender-defined security attribute to the file containing a digital representation of money, wherein the at least one sender-defined security attribute precludes unauthorized access to the file containing the digital representation of money, and wherein the at least one sender-defined security attribute is defined at the time of an electronic fund transfer;
  (c) means for attaching the file containing a digital representation of money to an electronic mail message; and
  (d) means for transmitting the electronic mail message with attached file containing a digital representation of money over an insecure network to a recipient, wherein the at least one security attribute is requirement that the recipient of the file containing a digital representation of money prove they are the intended recipient through either a random number generator card, smart card, or biometric scan comprised of a retina scan, fingerprint, or voiceprint.

123. The system of claim 122, further comprising means for allowing the recipient of the electronic mail message with attached file containing a digital representation of money to enter security indicia that allows access to the file containing a digital representation of money.

124. The system of claim 123, wherein the security indicia must be entered prior to a time limit for access upon receipt by the recipient, wherein the time limit is established by a sender who transmits the file.

125. The system of claim 124, wherein the recipient must acknowledge receipt of the file containing a digital representation of money within the time limit established by the sender.

126. The system of claim 124, wherein the recipient must register receipt of the file containing a digital representation of money with a third-party within the time limit established by the sender.

127. The system of claim 124, wherein the recipient must activate or access the file containing a digital representation of money within the time limit established by the sender.

128. The system of claim 122, wherein the at least one security attribute is the requirement that a recipient of the file containing a digital representation of money enter a password, social security number, employee identification number or personal identification number.

129. The system of claim 122, wherein the at least one security attribute is the requirement that a recipient of the file containing a digital representation of money prove they are the intended recipient through computer signature identification.

130. The system of claim 122, wherein the at least one security attribute is the requirement that a recipient of the file containing a digital representation of money prove they are the intended recipient through entry of a digital certificate or PKI.

131. The system of claim 122, wherein the means for transmitting the electronic mail message with attached file containing a digital representation of money to a recipient is a means for transmission over a distributed computer network.

132. The system of claim 131, wherein the computer network is the internet.

133. The system of claim 131, wherein the computer network is nonproprietary.

134. The system of claim 122, wherein application software for securely transferring electronic funds is resident on the transferor's computer.

135. The system of claim 122, wherein application software for securely transferring electronic funds is accessed from a computer or server remote from the transferor's computer on an as-needed basis.

136. The system of claim 122, further comprising means for receiving a confirmation that funds were successfully transferred.

137. The system of claim 136, wherein the confirmation is an electronic message from a clearing bank acknowledging transfer of title of the funds to the recipient.

138. The system of claim 137, wherein the confirmation further includes a unique number associated with the funds transfer.

139. The system of claim 136, wherein the confirmation is an electronic mail message from the recipient of the electronic funds.

140. The system of claim 136, wherein the confirmation is an electronic message from a network that the electronic message with digital cash file attached was delivered to the recipient.

141. The system of claim 122, wherein the electronic funds transfer is of money from a traditional bank account.

142. The system of claim 141, wherein the recipient of the money from a traditional bank account initiates the transfer.

143. The system of claim 141, wherein the electronic funds transfer of money is in one or more currencies or representations of money.

144. The system of claim 143, wherein the user can request from a clearing bank the conversion of one or more currencies or representations of money contained in a file containing a digital representation of money into different currencies or representations of money.

145. The system of claim 122, wherein one of the security attributes of the file containing a digital representation of money is a time limit for certain actions by the recipient.

146. A system for receiving a secure file containing electronic funds comprising:
(a) means for receiving an electronic mail message with an attached computer file containing a digital representation of money, via an insecure network, wherein the file containing a digital representation of money of money has at least one sender-defined security attribute which precludes unauthorized access to the file, and wherein the at least one sender-defined security attribute is defined at the time a sender sends the secure file; and
(b) means for entering security indicia, through the use of a computer program resident on a personal computer and without the use of a secure network, that allows access to the file containing a digital representation of money,
wherein the at least one security attribute requires that a recipient of the file containing a digital representation of money prove they are the intended recipient through either a random number generator card, smart card, or biometric scan comprised of a retina scan, fingerprint, or voiceprint.

147. The system of claim 146, wherein the security indicia is a verification by the recipient that the electronic message with attached file containing digital representation of money has been received by the correct party.

148. The system of claim 146, wherein the security indicia is a password, social security number, employee identification number or personal identification number.

149. The system of claim 146, wherein the security indicia is computer signature identification of the recipient.

150. The system of claim 146, wherein the security indicia is a digital certificate or PKI.

151. The system of claim 146, wherein the security indicia is a random number generator card or smart card.

152. The system of claim 146, wherein the security indicium is retinal scan data, a fingerprint or a voiceprint.

153. The system of claim 146, wherein the recipient transfers the digital representation of money to a traditional bank account.

154. The system of claim 153, wherein the electronic funds transfer of money is in one or more currencies or representations of money.

155. The system of claim 154, wherein the user can request from a clearing bank the conversion of one or more currencies or representations of money contained in a file containing a digital representation of money into different currencies or representations of money.

156. The system of claim 146, wherein the recipient maintains the file containing the digital representation of money in a digital form for future digital payments.

157. The system of claim 156, wherein the recipient maintains more than one currency or representation of money in a digital form for future digital payments.

158. The system of claim 146, wherein a recipient initiates the transfer and receives the money from a traditional bank account.

159. The system of claim 146, wherein one of the security attributes of the file containing a digital representation of money is a time limit for certain actions by the recipient.

160. The system of claim 146, wherein the security indicia must be entered prior to a time limit for access upon receipt by the recipient, wherein the time limit is established by a sender who transmits the file.

161. The system of claim 160, wherein the recipient must acknowledge receipt of the file containing a digital representation of money within the time limit established by the sender.

162. The system of claim 160, wherein the recipient must register receipt of the file containing a digital representation of money with a third-party within the time limit established by the sender.

163. The system of claim 160, wherein the recipient must activate or access the file containing a digital representation of money within the time limit established by the sender.

164. A programmed computer configured for securely transferring electronic funds comprising:
(a) a memory having at least one region for storing computer executable program code; and
(b) a processor for executing the program code stored in memory, wherein the program code includes:
(i) code for assigning at least one sender-defined security attribute to a digital rights management container containing a digital representation of money, without the use of a secure network, said code being resident on a personal computer, wherein the at least one security attribute precludes unauthorized access to the container containing the digital representation of money, and wherein the at least one sender-defined security attribute is defined at the time of an electronic fund transfer; and
(ii) code for transmitting the container containing a digital representation of money over an insecure network to a recipient,
wherein the at least one security attribute is requirement that the recipient of the digital rights management container containing a digital representation of money prove they are the intended recipient through either a random number generator card, smart card, or biometric scan comprised of a retina scan, fingerprint, or voiceprint.

165. The programmed computer of claim 164, wherein the electronic funds transfer of money is in one or more currencies or representations of money.

166. A programmed computer configured for receiving a digital rights management container containing electronic funds comprising:
(a) a memory having at least one region for storing computer executable program code; and
(b) a processor for executing the program code stored in memory, wherein the program code includes:

(i) code for receiving a digital rights management container containing a digital representation of money, via an insecure network, wherein the container containing a digital representation of money has at least one sender-defined security attribute which precludes unauthorized access to the container, and wherein the at least one sender-defined security attribute is defined at the time a sender sends the secure digital rights management container; and (ii) code for facilitating the entry of security indicia through the use of a personal computer and without the use of a secure network, that allows access to the container containing a digital representation of money, wherein the at least one security attribute is requirement that a recipient of the digital rights management container containing a digital representation of money prove they are the intended recipient through either a random number generator card, smart card, or biometric scan comprised of a retina scan, fingerprint, or voiceprint.

167. The programmed computer of claim 166, wherein the electronic funds transfer of money is in one or more currencies or representations of money.

168. Computer executable software code configured for securely transferring electronic finds comprising:

(a) code for assigning at least one sender-defined security attribute to a digital rights management container containing a digital representation of money, without the use of a secure network, said code being resident on a personal computer, wherein the at least one sender-defined security attribute precludes unauthorized access to the container containing the digital representation of money, and wherein the at least one sender-defined security attribute is defined at the time of an electronic funds transfer; and (b) code for transmitting the container containing a digital representation of money over an insecure network to a recipient, wherein the at least one security attribute requires that the recipient of the digital rights management container containing a digital representation of money prove they are the intended recipient through either a random number generator card, smart card, or biometric scan comprised of a retina scan, fingerprint, or voiceprint.

169. The computer executable software code of claim 168, wherein the code is stored on a computer readable medium.

170. The computer executable software code of claim 168, wherein the electronic funds transfer of money is in one or more currencies or representations of money.

171. Computer executable software code configured for receiving a secure file containing electronic funds comprising:

(a) code for receiving a digital rights management container containing a digital representation of money, via an insecure network, wherein the container containing a digital representation of money has at least one sender-defined security attribute which precludes unauthorized access to the container, and wherein the at least one sender-defined security attribute is defined at the time a sender sends the digital rights management container; and (b) code for facilitating the entry of security indicia through the use of a personal computer and without the use of a secure network, that allows access to the container containing a digital representation of money, wherein the at least one security attribute requires that a recipient of the digital rights management container containing a digital representation of money prove they are the intended recipient through either a random number generator card, smart card, or biometric scan comprised of a retina scan, fingerprint, or voiceprint.

172. The computer executable software code of claim 171, wherein the code is stored on a computer readable medium.

173. The computer executable software code of claim 171, wherein the electronic funds transfer of money is in one or more currencies or representations of money.

174. A programmed computer configured for securely transferring electronic funds comprising:

(a) a memory having at least one region for storing computer executable program code; and (b) a processor for executing the program code stored in memory, wherein the program code includes:

(i) code for creating a file containing a digital representation of money;

(ii) code for assigning at least one sender-defined security attribute to the file containing a digital representation of money, without the use of a secure network, said code being resident on a personal computer, wherein the at least one sender-defined security attribute precludes unauthorized access to the file containing the digital representation of money, and wherein the at least one sender-defined security attribute is defined at the time of an electronic fund transfer;

(iii) code for attaching the file containing a digital representation of money to an electronic mail message; and (iv) code for transmitting the electronic mail message with attached file containing a digital representation of money over an insecure network to a recipient, wherein the at least one security attribute requires that the recipient of the file containing a digital representation of money prove they are the intended recipient through either a random number generator card, smart card, or biometric scan comprised of a retina scan, fingerprint, or voiceprint.

175. The programmed computer of claim 174, wherein the electronic funds transfer of money is in one or more currencies or representations of money.

176. A programmed computer configured for receiving a secure file containing electronic funds comprising:

(a) a memory having at least one region for storing computer executable program code; and (b) a processor for executing the program code stored in memory, wherein the program code includes:

(i) code for receiving an electronic mail message with an attached file containing a digital representation of money, via an insecure network, wherein the file containing a digital representation of money has at least one sender-defined security attribute which precludes unauthorized access to the file, and wherein the at least one sender-defined security attribute is defined at the time a sender sends the secure file; and (ii) code for facilitating the entry of security indicia through the use of a personal computer and without the use of a secure network, that allows access to the file containing a digital representation of money, wherein the at least one security attribute requires that a recipient of the file containing a digital representation of money prove they are the intended recipient through either a random number generator card, smart card, or biometric scan comprised of a retina scan, fingerprint, or voiceprint.

177. The programmed computer of claim 176, wherein the electronic funds transfer of money is in one or more currencies or representations of money.

178. Computer executable software code configured for securely transferring electronic funds comprising:
   (a) code for creating a file containing a digital representation of money;
   (b) code for assigning at least one sender-defined security attribute to the file containing a digital representation of money, without the use of a secure network, said code being resident on a personal computer, wherein the at least one sender-defined security attribute precludes unauthorized access to the file containing the digital representation of money, and wherein the at least one sender-defined security attribute is defined at the time of an electronic fund transfer;
   (c) code for attaching the file containing a digital representation of money to an electronic mail message; and
   (d) code for transmitting the electronic mail message with attached file containing a digital representation of money over an insecure network to a recipient,
   wherein the at least one security attribute requires that the recipient of the file containing a digital representation of money prove they are the intended recipient through either a random number generator card, smart card, or biometric scan comprised of a retina scan, fingerprint, or voiceprint.

179. The computer executable software code of claim 178, wherein the code is stored on a computer readable medium.

180. The computer executable software code of claim 178, wherein the electronic funds transfer of money is in one or more currencies or representations of money.

181. Computer executable software code configured for receiving a secure file containing electronic funds comprising:
   (a) code for receiving an electronic mail message with an attached file containing a digital representation of money, via an insecure network, wherein the file containing a digital representation of money has at least one sender-defined security attribute which precludes unauthorized access to the file, and wherein the at least one sender-defined security attribute is defined at the time a sender sends the secure file; and
   (b) code for facilitating the entry of security indicia through the use of a personal computer and without the use of a secure network, that allows access to the file containing a digital representation of money,
   wherein the at least one security attribute requires that a recipient of the file containing a digital representation of money prove they are the intended recipient through either a random number generator card, smart card, or biometric scan comprised of a retina scan, fingerprint, or voiceprint.

182. The computer executable software code of claim 181, wherein the code is stored on a computer readable medium.

183. The computer executable software code of claim 181, wherein the electronic funds transfer of money is in one or more currencies or representations of money.

184. A method for receiving a digital rights management container containing electronic funds comprising:
   (a) receiving an electronic mail message with an attached digital rights management container containing a digital representation of money, via an insecure network, wherein the container containing a digital representation of money has at least one sender-defined security attribute which precludes unauthorized access to the container, and wherein the at least one sender-defined security attribute is defined at the time of an electronic fund transfer; and
   (b) entering security indicia, through the use of a computer program resident on a personal computer and without the use of a secure network, which allows access to the container containing a digital representation of money,
   wherein the at least one security attribute requires that a recipient of the digital rights management container containing a digital representation of money prove they are the intended recipient through either a random number generator card, smart card, or biometric scan comprised of a retina scan, fingerprint, or voiceprint.

* * * * *